May 12, 1925.

S. ESHBORN 1,537,813

ADVERTISING DISPLAY

Filed April 27, 1923

INVENTOR.
Samuel Eshborn
BY
George C. Heinick
ATTORNEY.

Patented May 12, 1925.

1,537,813

UNITED STATES PATENT OFFICE.

SAMUEL ESHBORN, OF NEW YORK, N. Y.

ADVERTISING DISPLAY.

Application filed April 27, 1923. Serial No. 635,035.

*To all whom it may concern:*

Be it known that I, SAMUEL ESHBORN, a citizen of the United States, residing at New York, county of New York, and State of New York, have invented certain new and useful Improvements in Advertising Display, of which the following is a specification.

My invention relates to an advertising display, and more particularly to an improved display or guide for a series of main springs for phonograph motors.

It is the principal object of my invention to combine the novel display or guide with a confidential price list normally concealed or protected against inspection.

These and other objects of my invention will become more fully known as the description thereof proceeds, and will then be specifically pointed out in the appended claim.

In the accompanying drawing, forming a material part of this disclosure:—

Figure 1 is a front elevation of a chart and price list combined therewith made according to the present invention.

Figure 2 is a similar view with the price list concealed.

Figure 3 is a longitudinal section through chart and folded price list on line 3—3 of Figure 2.

The display forming the subject of this invention comprises a chart 10, having an upper section 11 constituting a confidential price list 12 adapted to be folded upon itself along a crease 12' and provided at its upper edge with a flap 13 adapted to be passed through a slot 14 in the chart between upper part 11 and lower part 15 thereof, when the price list is folded, in order to hide the prices from view, and keep the same concealed until the salesman desires to consult the same.

The lower part 15 of the chart 10 shows a plurality of columns 16 used for the display of such useful information as the nature of the motor to be used with the various types of phonographs and the various types of springs to be used with such motors.

Each column of the chart carries a number or identification symbol corresponding to the number or identification symbol on the price list. Each column furthermore gives the exact measurements of the springs.

It will of course be understood that the numbers and symbols mentioned are arbitrarily chosen for the sake of illustration and may be any other numeral or symbol desired.

The outer face of the folded price list carries suitable inscriptions as for instance "Hang this guide in your work room" etc., while the lower end of part 15 carries instructions for replacing broken springs and the name of the dealer. It will however be clear that many improvements and changes or variations in the chart and legends from the precise arrangement illustrated, may be made without departing from the spirit and scope of my invention.

In using my improved chart the same may be suspended at any convenient place in a work shop in order to enable the shopmen to select at a glance the proper spring for motors of any make, or for making repairs to broken springs so that the workmen will be able to readily select the same type of spring as the one it is to be coupled with in order to secure an even power of propulsion and a uniform speed for the revolution of the spring barrels inherent to motors with new springs of even type.

In order to allow a ready calculation of spring prices, etc., a convenient inspection of the price list is possible by withdrawing the flap 13 from slot 14, while ordinarily these prices are concealed from inspection by unauthorized persons.

Having thus described my invention what I claim as new and desire to protect by Letters Patent is:

A chart divided into a lower section and an upper section, the chart being formed with a slot intermediate the divisions, the cover section having foldable connection with the upper edge of the chart and adapted when folded to cover and conceal the upper section of the chart, said cover section having a tongue adapted to be passed through the slot when the cover section is in folded relation, the cover section when open being aligned with the chart proper to provide an extension of the upper surface of the chart for the reception of data to be concealed when the cover section is in folded relation.

In testimony whereof I have affixed my signature.

SAMUEL ESHBORN.